United States Patent [19]
Engelsmann et al.

[11] 3,812,503
[45] May 21, 1974

[54] EXPOSURE INDICATOR FOR A PHOTOGRAPHIC CAMERA

[75] Inventors: Dieter Engelsmann, Unterhaching; Eduard Wagensonner, Aschheim; Alois Rieder; Bernhard Von Fischern, both of Munich, all of, Munich, all of Germany

[73] Assignee: Agfa-Gevaert Aktiengesellschaft, Leverkusen, Germany

[22] Filed: Nov. 28, 1972

[21] Appl. No.: 310,085

[30] Foreign Application Priority Data
Nov. 29, 1971 Germany............................ 2159160
Nov. 29, 1971 Germany............................ 2159162

[52] U.S. Cl. .................................................. 354/60
[51] Int. Cl. ............................................. G03b 7/00
[58] Field of Search ............ 95/10 CE, 10 CT, 10 C

[56] References Cited
UNITED STATES PATENTS
3,603,799  9/1971  Nobusawa...................... 95/10 UX
3,683,765  8/1972  Iura................................ 95/10

*Primary Examiner*—Richard M. Sheer
*Assistant Examiner*—Michael L. Gellner
*Attorney, Agent, or Firm*—Michael S. Striker

[57] ABSTRACT

A photosensitive element is mounted to receive the light available for exposure and constitutes part of a voltage divider which has a number of taps. Each of the taps is connected to the input of a bistable stage. As the threshold of each bistable stage is passed, it serves to connect a corresponding one of a plurality of indicators to a battery, thereby energizing it. Passing of the threshold of the next-following indicator then causes a diode to short circuit the first indicator and the energization of the second indicator. Each bistable stage thus in turn energizes its indicator and short circuits the previous indicator. Thus only that indicator remains energized for which the voltage at its corresponding voltage divider tap is most closely equal to the threshold voltage of the corresponding bistable stage.

19 Claims, 8 Drawing Figures

EXPOSURE INDICATOR FOR A PHOTOGRAPHIC CAMERA

BACKGROUND OF THE INVENTION:

This invention relates to a photographic camera having an exposure indicator for indicating either exposure time or diaphragm opening.

In known arrangements of this type, the exposure or light meter comprises a moving coil instrument whose indication corresponds to the desired diaphgragm opening and exposure time. This type of arrangement may be difficult to read and in any case requires a considerable amount of power to activate.

SUMMARY OF THE INVENTION:

It is an object of the present invention to furnish an exposure indicator for a photographic camera wherein the required exposure time and/or the required diaphragm opening are indicated each by the activation of an individual indicator element which carries symbols indicating the corresponding exposure time and/or diaphragm opening. This type of arrangement results in easy readability and very low power consumption.

The present invention comprises an indicator arrangement in a photographic camera which has a plurality of indicator means, each for indicating a predetermined exposure value upon receipt of an activation signal. Photosensitive transducing means are positioned in the path of the light available for exposure and furnish an electrical signal varying as a function of light instant thereon. A plurality of switching stages, each having an input connected to said photosensitive transducing means and an output connected to a corresponding one of said indicator means, are provided each for furnishing said activation signal to said corresponding one of said indicator means when said electrical signal passes a corresponding threshold value. Finally, control circuit means are provided and are connected between said plurality of switching stages and said plurality of indicator means in such a manner that only the activation signal furnished by the switching stage having a threshold value closest to the value of said electrical signal is transmitted to the corresponding one of said plurality of indicator means.

In a preferred embodiment of the present invention said switching stages furnish said activation signals in a predetermined order. Further, the control circuit means comprise shunting means each shunting a given one of said indicator means thereby preventing the application of said activating signal thereto, following the furnishing of said activation signal by the next-following one of said switching stages in said predetermined order.

In a further preferred embodiment of the present invention, the switching stages may comprise bistable stages having equal threshold values, the inputs of the threshold stages being connected to voltage divider taps of voltage divider means, comprising the photosensitive element.

It is of course also possible to use switching stages having different threshold values. For example, the difference in threshold values between consecutive stages may be a constant difference.

In a further preferred embodiment of the present invention, a protective resistor is connected in series with each of the indicator means. A diode shunts each of the indicator means when the next subsequent bistable stage furnishes the activation signal for the next subsequent indicator means.

The photosensitive means may be arranged at either extremity of the voltage divider resistors. Depending upon the positioning of the photosensitive element, the bistable stages may be in a conductive state for either maximum or minimum illumination.

The indicator means may be luminescent diodes, incandescent lamps or fluid crystals.

Further, the diodes shuntng each indicator element may be replaced by the collector-emitter circuit of transistors. The base of the transistors is then connected with the output of the next subsequent switching stage. Paths may then be provided in the output circuits of the transistors for decoupling purposes.

In a particularly preferred embodiment of the present inention, the indicator means are mounted in fixed positions in the viewfinder. A follow-up system is then provided wherein the exposure time setting means or the f-stop adjusting means are mechanically coupled to a suitable indicator selector lever. In this embodiment either the exposure time setting means or the f-stop adjusting means are moved until the indicator selector lever is opposite the activated indicator element. In this way the correct setting of the time or the diaphragm opening is readily accomplished with little possibility of error.

Further, the f-stop adjusting means may be coupled to an auxiliary diaphragm which is positioned in front of the photosensitive element. Alternatively, the f-stop adjusting means may be coupled to the variable arm of a resistor which is connected in series with the photosensitive element. In either case the effect of the photosensitive element is varied in accordance with the diaphgram opening.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS:

A preferred embodiment of the present invention will now be described with reference to the drawing.

Figure 1:
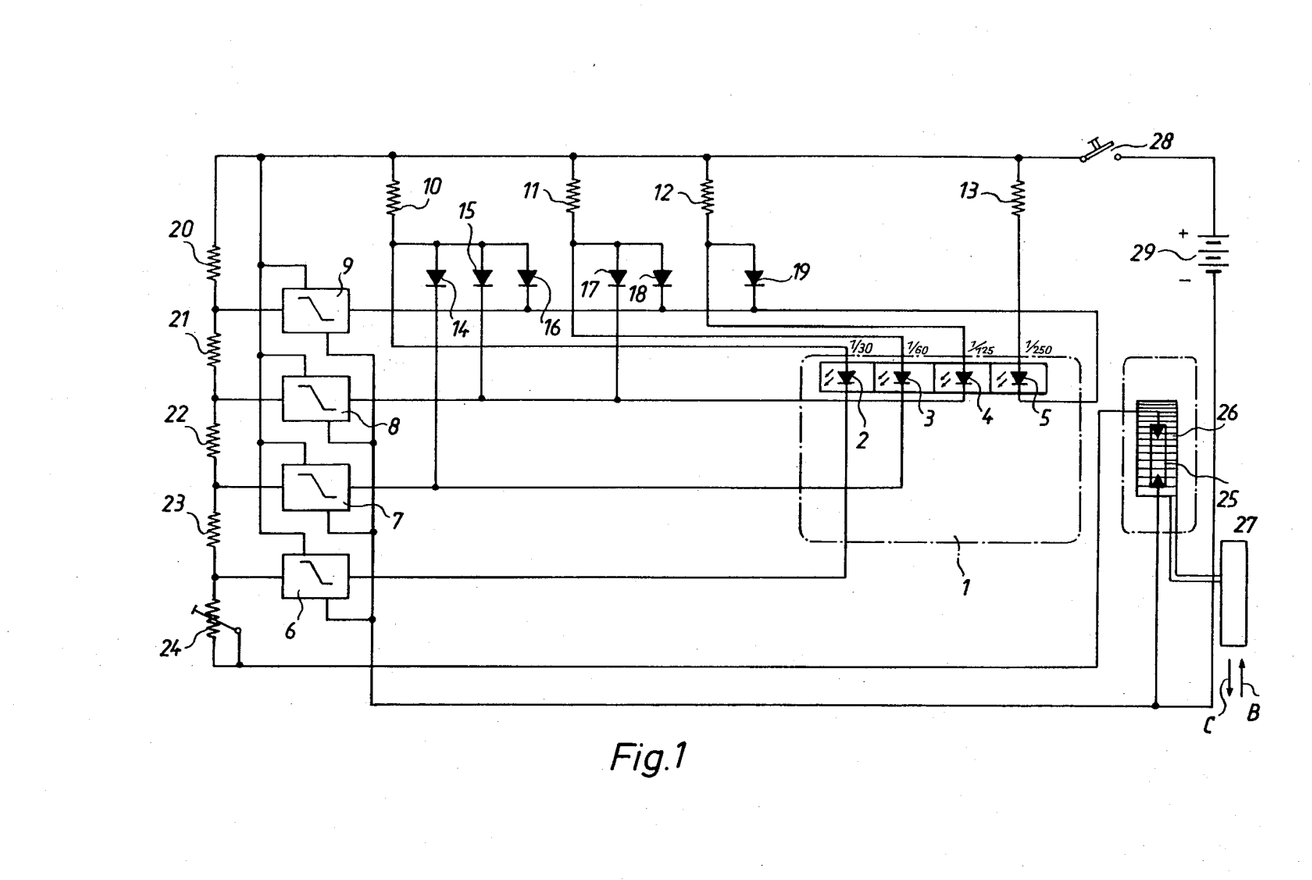
FIG. 1 is a schematic diagram of a first embodiment of the present invention.

Shown in FIG. 1 is a viewfinder, 1, in the field of which are arranged four luminescent diodes 2,3,4 and 5. These diodes are to furnish an indication of, respectively, required exposure times of 1/30, 1/60, 1/125, and 1/250 of a second. Diodes 2,3,4 and 5 are connected in the output circuits of switching stages 6,7,8 and 9, respectively. All switching stages mentioned above are bistable stages having identical elements and are shown in FIG. 1a.

Protective resistors 10,11,12 and 13 are connected in series with diodes 2,3,4 and 5, respectively. The other terminals of resistors 10,11,12 and 13 are connected in common to one side of a switch 28 whose other side is connected to the positive terminal of a battery 29. Connected to the common point of diode 2 and resistor 10 are the anodes of three diodes 14,15 and 16. The cathodes of diodes 14,15 and 16 are connected, respectively, to the outputs of switching stages 7,8 and 9. Similarly diodes 17 and 18 have anodes connected in common to the common point of resistor 11 and indicator element 3 and have cathodes respectively connected to the outputs of switching stages 8 and 9. A diode 19 has the anode connected to the common point of resistor 12 and indicator element 4 and a cathode connected to the output of switching stage 9.

Voltage divider means comprising fixed resistors 20, 21,22 and 23, as well as the variable resistor 24 and a photosensitive element 25 are connected in parallel to battery 29 through switch 28. Voltage divider taps, namely the common points of resistors 20,21; 21,22; 22,23; and 23,24, are connected, respectively, to the inputs of switching stages 9,8,7 and 6. A grey wedge 26 is positioned relative to photosensitive element 25 and is operable in conjunction with f-stop adjusting means 27. The f-stop adjusting means 27 may be operated in the direction of arrows B and C.

Figure 1A:
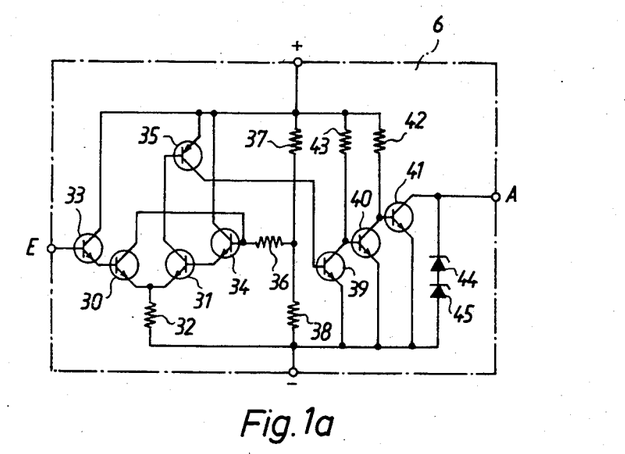
FIG. 1a is a bistable stage for use in the circuit of FIG. 1.

FIG. 1a shows a preferred embodiment of switching stages 6,7,8 and 9, which, as previously mentioned are all identical stages. Shown in FIG. 1a switching stage 6 which comprises transistors 30 and 31 having a common emitter resistor 32. The base of transistor 30 is connected to the emitter of an input transistor 33 whose collector is connected to the positive side of the battery. The base of transistor 31 is connected to the emitter of transistor 34 whose collector is also connected to the plus line. The base of transistor 34 is directly connected to the collector of transistor 30. The collector of transistor 31 is connected to the base of a transistor 35, whose emitter is connected to the positive side of the battery. The base of transistor 34 is connected to the voltage divider tap of a voltage divider comprising resistors 37 and 38, through a resistor 36. The collector of transistor 35 is connected to the base of a transistor 39 whose collector is connected to the positive side of the battery through a resistor 34. The collector of transistor 39 is in turn connected to the base of a transistor 40 whose collector is connected to the base of a transistor 41. The collector of transistor 40 is also connected to the positive side of the battery through a resistor 42. The emitters of transistors 39,40 and 41 are all directly connected to the negative side of the battery. The collector of output transistor 41 is connected through two Zener diodes 40,45 to the negative side of the battery.

The above-described arrangement constitutes a differential amplifier whose output transistor (41) becomes conductive when the voltage at the base of transistor 33 (point E in FIG. 1a) is less than a predetermined threshold voltage. When transistor 41 is conductive point A is of course connected to substantially the negative battery potential.

The above-described arrangements operate as follows:

When the light available for an exposure is very low or when the diaphragm has a very small opening, the resistance of photoelement 25, which is a photoresistor, is sufficiently high that the voltages at the inputs of switching stages 6-9 exceed the threshold value thereof. Thus none of the output transistors 41 is conductive, interrupting the connection to ground from point A. None of the incandescent diodes glow. As the resistance value of the photoresistor decreases, the threshold value of switching stage 6 is passed, i.e., the voltage at point E is less than the voltage determined by the voltage divider ratio of resistors 37 and 38, output transistor 41 associated with stage 6 becomes conductive. The circuit for glow diode 2 is thus completed from the positive to the negative side of the battery and this indicator begins to glow showing a required exposure time of 1/30 of a second. As the value of photoresistor 25 decreases further, the threshold value of stage 7 is also passed and output transistors 41 of threshold stage 7 becomes conductive. This causes diode 3 to light up, indicating a required exposure time of 1/60 of a second. At this point diode 2 is extinguished, since diode 14 in conjunction with conductive transistor 41 of stage 7 serve to short-circuit this diode. Next, the threshold value of stage 8 is passed, causing diode 4 to glow. Simultaneously, diode 3 is extinguished, since it is short-circuited by means of diode 17 and the output transistor of stage 8.

A further increase of light impinging upon photoresistor 25 causes the threshold value of stage 9 to be passed and therefore diode 5 to glow. Again, diode 4 is extinguished since it is shunted by diode 19 and switching stage 9.

Figure 2:
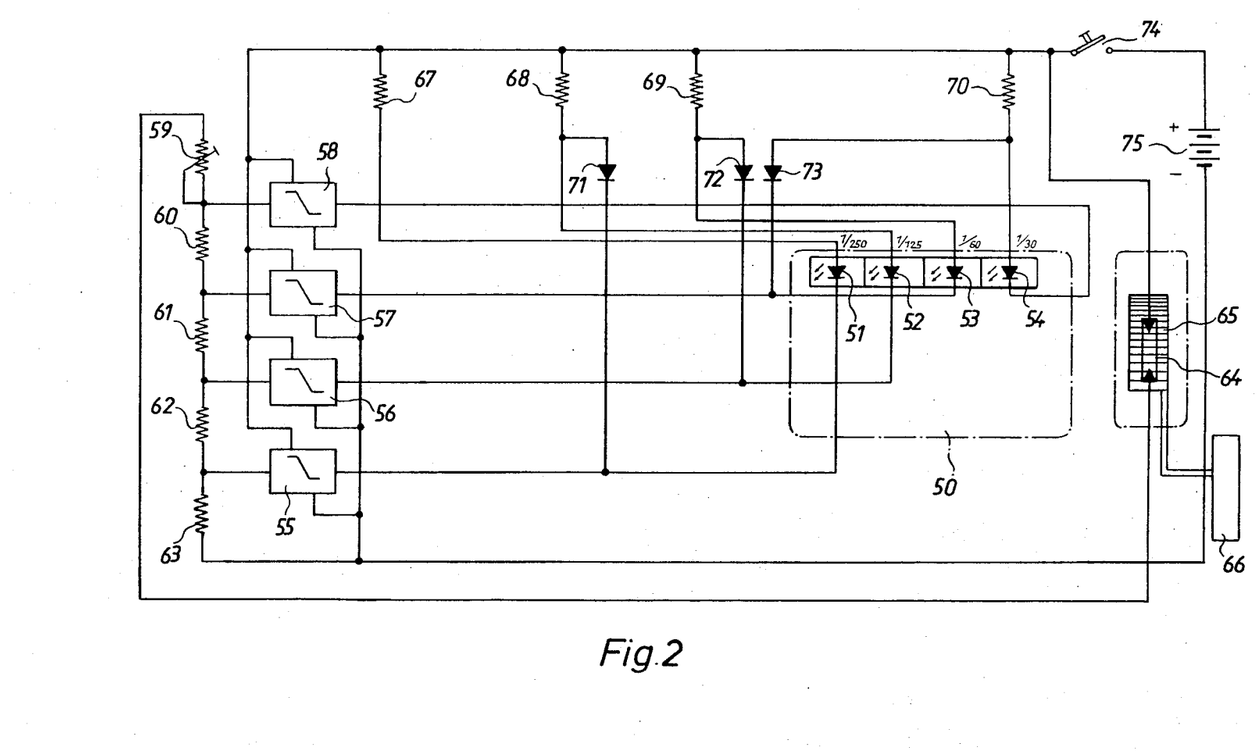
FIG. 2 is a second embodiment of the present invention.

A second preferred embodiment of the present invention is shown in FIG. 2. In this Figure the viewfinder is denoted by reference numeral 50 and has arranged in its field diodes 51, 52, 53 and 54, each constituting indicator means. The switching stages associated with diodes 51–54 have reference numerals 55–58 respectively. A voltage divider comprises a photoresistor connected through a switch 74 to the positive side of a battery 75 and further comprises resistors 59–63 connected from the other side of photoresistor 65 to the negative side of the battery. A grey wedge 65, coupled to the f-stop adjusting means 66 is positioned in front of photoelement 64 in the direction of propagation of light impinging on said photoelement.

Figure 2A:
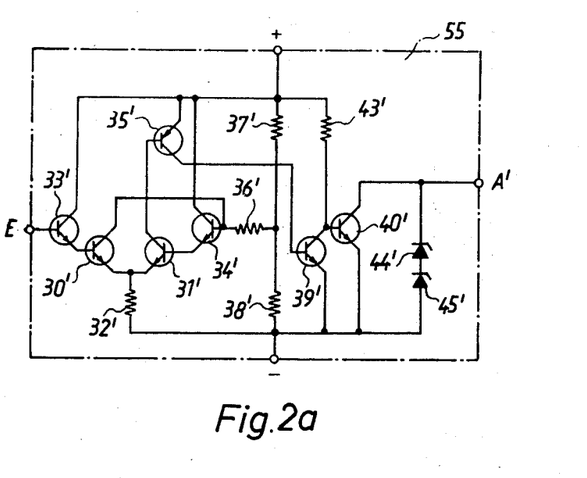
FIG. 2a is a bistable stage suitable for use in the embodiment of FIG. 2.

Similarly as in FIG. 1, protective resistors 67–70 are connected in series with indicator elements 51–54, respectively. A diode 71 is connected from the common point of resistor 68 and diode 52 to the output of stage 55, a diode 72 is similarly connected from the common point of resistor 69 and element 53 to the output of stage 56 and a diode 73 is connected from the common point of resistor 70 and diode 54 to the output of stage 57. FIG. 2a shows the bistable stages suitable for use as stages 55–58 in FIG. 2. Again, stages 55–58 are identical stages. Further, it will be noted that FIG. 2a is identical to FIG. 1a except that output transistor 41 is missing. For this reason reference numerals in FIG. 2a are identical to reference numeral in FIG. 1a, except that a prime sign has been added. It will be noted that with output transistor 41 missing, terminal A' is connected to ground, i.e., transistor 40' is conductive, when the voltage terminal E exceeds the voltage determined by the voltage divider ratio of resistors 37' and 38'.

Diodes 51, 52, 53 and 54, when energized, indicate a required exposure time of 1/250, 1/125, 1/60 and 1/130 of a second respectively. When the resistance of photoresistor 64 changes from high towards lower values, the stages 58,57,56 and 55 become conductive in turn. Thus diode 54 will be activated first, and will subsequently be short-circuited, upon activation of diode 53, by diode 73 in conjunction with stage 57. When diode 52 becomes energized through the passing of the threshold of stage 56, diode 53 is short-circuited by means of diode 72 and said stage 56. Finally, after diode 51 begins to glow, diode 52 is short-circuited through diode 71 and stage 55. Thus, depending upon the available illumination and the diaphragm opening size, only a single indicator means, that is only a single incandescent diode, will light at any one time.

It should further be noted relative to the embodiment shown in FIGS. 1 and 2, that although there are three diodes 14, 15 and 16 shows in FIG. 1, any of which could short-circuit indicating element 2 when the stage to the output of which it is connected becomes conductive, only diode 14 is absolutely required. Diodes 15 and 16 merely increase the reliability of the system. The same is true of diode 18. It will be noted that in FIG. 2 only one diode each is shown for short-circuiting the respective stages in the indicator.

Figure 3:
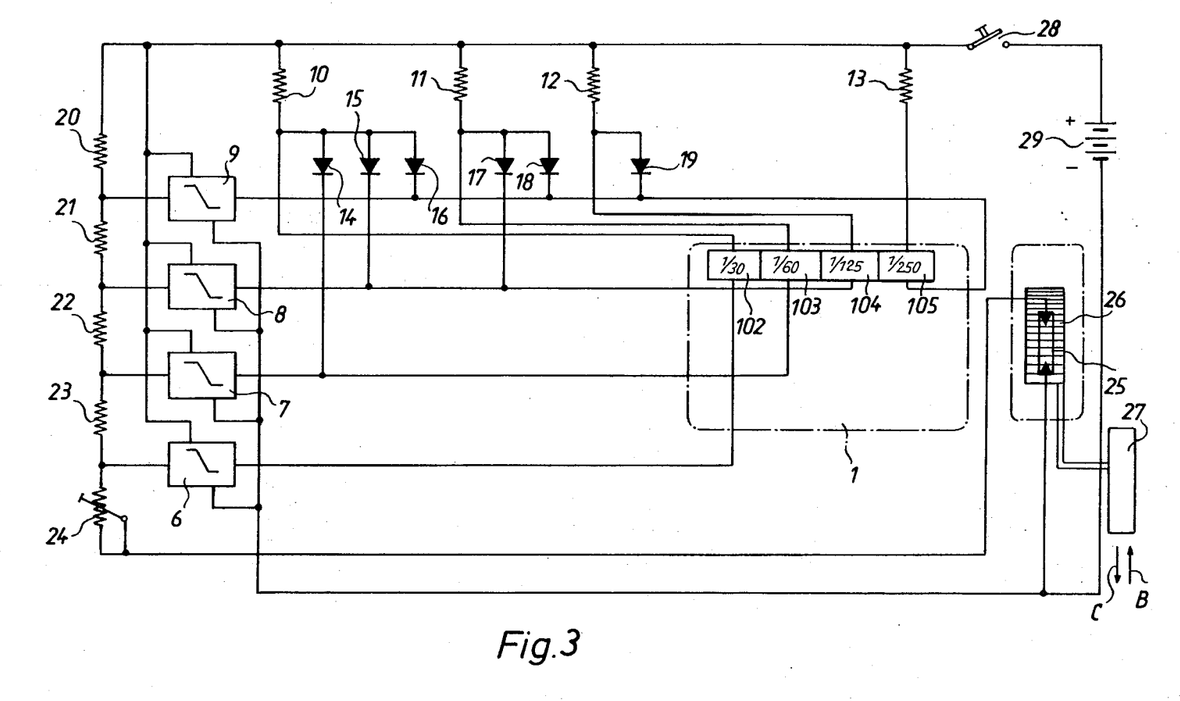
FIG. 3 is a third embodiment of the present invention.

Since the embodiment shown in FIG. 3 corresponds almost exactly to that shown in FIG. 1, the corresponding elements have the same reference numerals. It will be noted that the only difference between FIGS. 1 and 3 is in the indicator elements. Specifically, in FIG. 3, fluid crystals 102–105 have replaced the luminescent diodes 2,3,4, and 5. The fluid crystals 102–105 are the type of fluid crystals which are switched from a light transmissive into an opaque condition when a voltage is applied thereto. A voltage is of course applied to these crystals when the corresponding switching stage becomes conductive. The fluid crystals consume very little power and are therefore very desirable since the battery life will be prolonged. The operation of the system of FIG. 3 is identical to that of FIG. 1 except that the selected fluid crystal becomes opaque. An indicator system, such as for example the one which will be described with reference to FIG. 6, can then be used to position an indicating selector element over the dark spot. Alternatively, the exposure time symbols could be on a luminescent scale which is mounted over the fluid crystals. The desired value would then become visible over that crystal which is opaque to light. It is also possible in the embodiment of FIG. 3 to use fluid crystals which change from a light transmissive to a diffusely reflecting state upon application of a voltage. These crystals have electrodes which are light transmissive under all conditions and one of which carries the symbols which correspond to the desired exposure time. When a voltage is applied to one of these crystals, the region underneath the electrode becomes diffusely reflecting, thereby allowing the symbols to be viewed.

Figure 4:
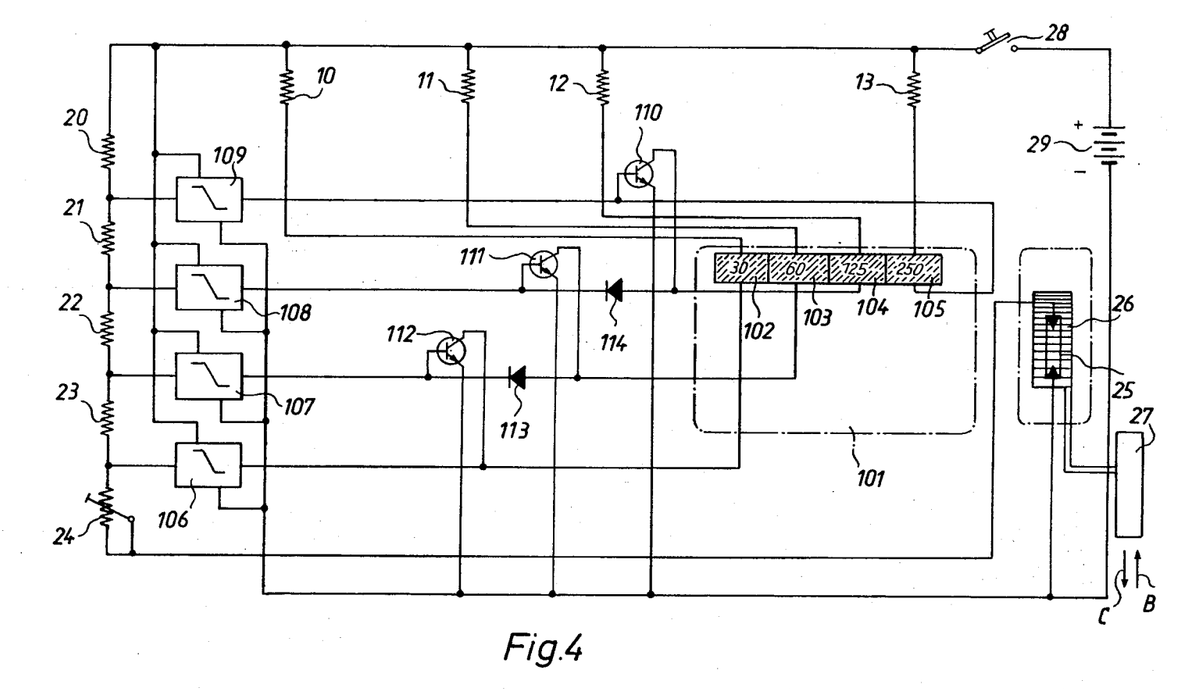
FIG. 4 is a fourth embodiment of the present invention.

In the embodiment shown in FIG. 4, which is very similar to that of FIG. 3, the corresponding elements have the same reference numerals. FIG. 4 differs from FIG. 3 in that diodes 14,17 and 19 have been replaced by transistors 110,111 and 112. Further, the switching stages, which are denoted by reference numerals 106,107,108 and 109 have the construction shown in FIG. 2a. It will be noted that the emitter-collector circuit of transistor 110 is connected in parallel with the output of switching stage 108, the collector-emitter circuit of transistor 111 is connected in parallel to the output of switching stage 107, and the collector-emitter circuit of transistor 112 is connected in parallel to the output of switching stage 106. The base of transistor 110 is connected to the output of stage 109, while the bases of transistors 111 and 112 are, respectively, connected to the outputs of stages 108 and 107. A diode 114 is connected between the base of transistor 111 and the collector of transistor 110, while the diode 114 is connected between the base of transistor 112 and the collector of transistor 111.

The above arrangement operates as follows:

Under very low lighting conditions, all stages 106–109 are conductive. All fluid crystals 102,103,104 and 105 therefore has a voltage applied thereto, causing all of the stages to be opaque.

As the light intensity increases, the switching stage 106 is the first one to change state. This removes the potential difference across crystal 102 causing this to become light transmissive. A further increase in light intensity causes switching stage 107 to become blocked, causing fluid crystal 103 to become light transmissive. Simultaneously, a positive voltage is applied to the base of transistor 112, causing the emitter-collector circuit of this transistor to become conductive, thereby reestablishing the voltage across crystal 102. Crystal 102 therefore becomes opaque.

Further increase in light intensity causes the remaining fluid crystals to become alternately light transmissive and opaque in the same fashion. The function of diodes 113 and 114 is merely to decouple the bases of transistors 111 and 112 from the collectors of transistors 111 and 110.

It will be noted that in this embodiment also, only the crystal having the correct exposure time value is activated. In this case a light transmissive crystal is the crystal serving as active indicator.

Figure 5:
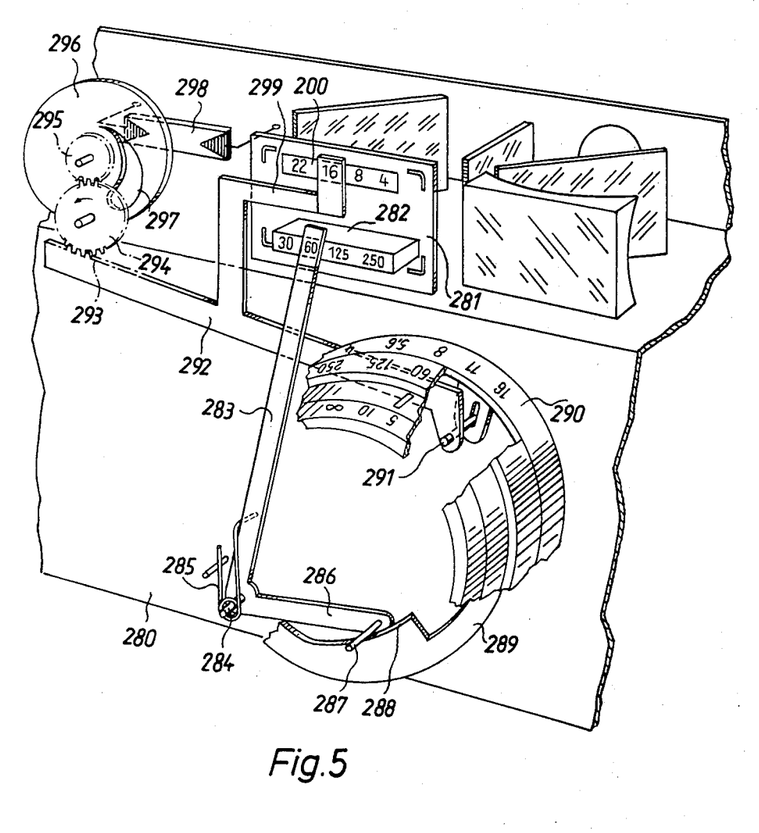
FIG. 5 is a fifth embodiment of the present invention.

A further embodiment of the present invention is shown in FIG. 5. Here lamps 251,252,253 and 254 are arranged in a fixed position within viewfinder 250. The switching stages assocated with lamps 251–254 are designated, respectively, by reference numerals 255–258. A voltage divider comprising a photoresistor 264, a variable resistor 259 and fixed resistors 260–263 is connected from the positive to the negative side of the battery through a switch 274. The battery is designated by reference numeral 275. Resistor 259 has a variable arm which is operable in conjunction with $f$-stop adjusting means 310. These $f$-stop adjusting means correspond to the $f$-stop adjusting means having reference numeral 66 in FIG. 2. The movement of these adjusting means is in the directions of arrows E and F.

Protective resistors 267–270 are connected in series with, respectively, lamps 251–254. Lamp 252 may be short-circuited by means of a diode 271, while lamps 253 and 254 may be shunted by diodes 272 and 273, respectively.

The arrangement of FIG. 5 operates similarly to that shown in FIG. 2. Switching stages 255–258 have the same construction as shown in FIG. 2a and has equal threshold values.

Lamp 251 is assigned to indicate the necessity for the shortest exposure time, namely 2/500 of a second, while lamps 252, 253 and 254, respectively indicate required exposure times of 1/125, 1/60 and 1/30 of a second. It will be noted that in this embodiment an increase in resistance 259 has exactly the same effect on switching stages 255–258 as does an increase in resistance 264, the photosensitive element. Thus, as the combined resistance of resistors 264 and 259 increases from the maximum resistance at low available light or for very small diaphragm openings, the switching stages 258, 257, 256 and 255 become conductive in that order. Thus lamp 254, indicating the maximum exposure time, will light first. After stage 257 becomes conductive lamp 254 is shunted by diode 273, causing only lamp 253 to remain lit. Similarly, the remaining stages operate under increased light conditions as was discussed with reference to FIG. 2. Again, for any given value of illumination and in dependence on the adjustment of the diaphragm opening, only a single lamp will light.

Figure 6:
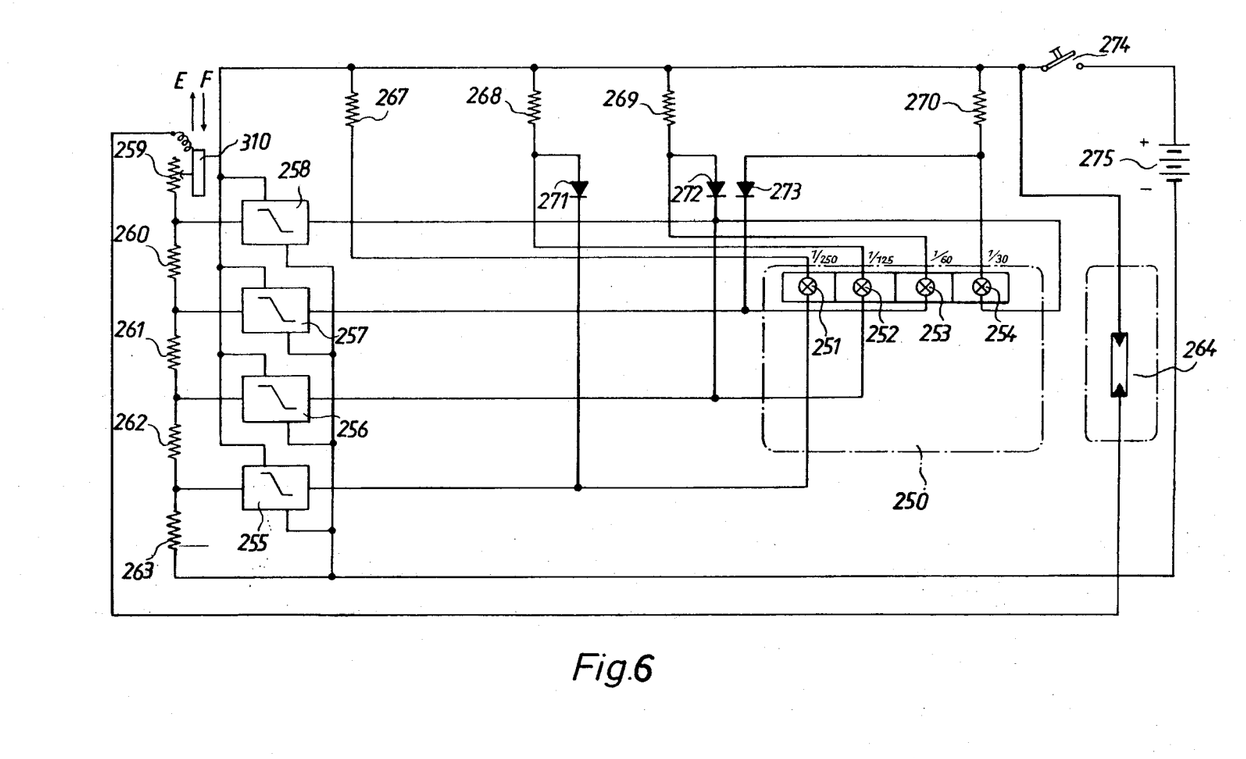
FIG. 6 shows the mechanical aspects of the present invention in detail.

FIG. 6 shows the mechanical follow-up system wherein these indicators may be used. In FIG. 6, the camera housing is denoted by reference numeral 280. The viewfinder is denoted by reference numeral 281. Arranged within the viewfinder are indicator means which have been incorporated into a building block 282. Indicator selector means, here a movable lever 283, has one extremety which is, preferably, both tinted and transparent and is positioned in front of unit 282. The lever is pivotable about an axis 284 and acts under the force of a spring 285. The lever is L-shaped, with the intersection of the members at the pivoting point 284 and its lower portion 286 has a projection 287 which cooperates with a curve 288 which is part of the exposure time adjustment means 289.

The f-stop adjusting means has a reference numeral 290. A pin connection connects the f-stop adjusting means to a lever 292 which has gear teeth 293 which in turn drive a diaphragm disk 296 via gears 294 and 295. Diaphragm disk 296 has a trumpet shaped opening 297. Arranged behind diaphragm disk 296 is the photoresistor 298. An extension 299 of lever 292 has a light transmissive tinted extremety and moves along a diaphragm scale 200 which is positioned in the viewfinder.

The above-described arrangement operates as follows:

Under given conditions of available light and depending on the size of the diaphragm opening, one of the indicator means will be active, for example the indicator means showing a required illumination time of 1/250 of a second. The exposure time adjustment means 289 then are activated by the photographer to move lever 283 until the free end of said lever is in front of the active indicator element. Of course it is also possible to move the f-stop adjusting ring 290 and its lever 299 until such time as the indicator element positioned behind lever 283 becomes active.

It will be seen that the above-described indicator arrangements when used with the follow-up system described in FIG. 6 form a reliable simple system requiring little power consumption.

While the invention has been illustrated and described as embodied in particular circuits for allowing only one indicator to light at any one time, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. In a photographic camera, an indicator arrangement, comprising, in combination, a plurality of indicator means, each for indicating a predetermined exposure value upon receipt of an activation signal; photosensitive transducing means for furnishing an electrical signal varying as a function of light incident thereon; a plurality of switching stages each having a first circuit element connected to said photosensitive transducing means, each of said first circuit elements having a first state when said electrical signal is less than a corresponding threshold value and a second state when said electrical signal is greater than said corresponding threshold value, and a second circuit element connected to said first circuit element in such a manner that said second circuit element is in said second and first state respectively when said first circuit element is in said first and second state respectively; connecting means for connecting each of said second circuit elements to a corresponding one of said indicator means in such a manner that said second circuit element furnishes said activation signal to said corresponding one of said indicator means when in said second state; means for interconnecting said switching stages in a predetermined sequence of increasing threshold values; and a plurality of third circuit elements each having a first terminal connected to a corresponding one of said indicator means and a second terminal connected to said second circuit element of the next subsequent one of said switching stages in said predetermined sequence, for shunting said activation signal from said corresponding one of said indicator means when said second circuit element of said subsequent switching stage is in said first state, whereby application of said activation signal to a given one of said indicator means causes deactivation of the previous one of said indicator means in said predetermined sequence.

2. An arrangement as set forth in claim 1, wherein said photographic camera has a view finder; and wherein said indicator means are arranged in said view finder.

3. An arrangement as set forth in claim 1, wherein said indicator means comprise luminescent diodes.

4. An arrangement as set forth in claim 1, wherein said indicator means comprise incandescent lamps.

5. An arrangement as set forth in claim 1, wherein said indicator means comprise fluid crystals having a light transmissive and an opaque state and changing from said light transmissive to said opaque state upon application of a voltage thereto.

6. An arrangement as set forth in claim 5, wherein each of said fluid crystals has a light transmissive wall, and wherein each of said predetermined exposure values is represented by a symbol arranged on said light transmissive wall, said symbol being visible when said fluid crystal is in said opaque state.

7. An arrangement as set forth in claim 5, wherein said indicator means further comprise light transmissive disk means having indicator symbols, said light transmissive disk means being positioned in a predetermined position relative to said fluid crystals.

8. An arrangement as set forth in claim 5, wherein said fluid crystals are arranged next to each other; further comprising a plurality of opaque walls separating each of said crystals from the next subsequent one of said crystals.

9. An arrangement as set forth in claim 1, wherein said photographic camera further has a diaphragm and f-stop adjusting means for adjusting the opening of said diaphragm; further comprising auxiliary diaphragm means mechanically coupled to said f-stop adjusting means for movement therewith, said auxiliary diaphragm means transmitting light varying as a function of the position thereof; and wherein said photosensitive means is mounted behind said auxiliary diaphragm means in the direction of light propagation, whereby the position of said auxiliary diaphragm means varies the quantity of light falling on said photosensitive means.

10. An arrangement as set forth in claim 9, wherein said photographic camera further comprises exposure time setting means and a view finder; wherein each of said plurality of indicator means is mounted in a fixed position in said view finder; further comprising indicator selector means coupled to said exposure time setting means in such a manner that the exposure time is set for the desired exposure time when said indicator selector means is in a predetermined position relative to the activated one of said indicator means.

11. An arrangement as set forth in claim 9, further comprising variable resistor means having a variable arm connected to said f-stop adjusting means for movement therewith; and means connecting said variable resistor means in series with said photosensitive means.

12. An arrangement as set forth in claim 1, wherein said indicator means comprise fluid crystal means having a a light transmissive state for suppressing said indication and a light diffusely reflecting state for furnishing said indication; and wherein said fluid crystal means is adapted to change from said light transmissive state to said diffusely reflecting state upon application of a voltage thereto.

13. An arrangement as set forth in claim 1, further comprising a source of electrical energy; wherein said means for interconnecting said switching stages comprise voltage divider means, having a plurality of voltage divider taps, connected to said source of electrical energy and said photosensitive means; and wherein each of said first circuit elements of said switching stages is connected to a corresponding one of said voltage divider taps.

14. An arrangement as set forth in claim 13, wherein said source of electrical energy has a first and a second terminal; wherein each of said indicator means has a first terminal connected to said first terminal of said source of electrical energy and a second terminal; and wherein each of said second circuit elements connects said second terminal of said corresponding one of said plurality of indicator means to said second terminal of said source of electrical energy when furnishing said activation signal.

15. An arrangement as set forth in claim 14, further comprising resistance means interconnected between said first terminal of said source of electrical energy and said first terminals of said indicator means.

16. An arrangement as set forth in claim 15, wherein said first and second state are a conductive and blocked state respectively; wherein each of said second circuit elements constitutes a low resistance path to ground potential when in said first state; and wherein each of said third circuit elements is a diode having a first terminal connected to said first terminal of said indicator means and a second terminal connected to said second circuit element of said next subsequent switching stage, whereby each of said diodes short-circuits the corresponding one of said indicator means upon activation of the next subsequent one of said indicator means.

17. An arrangement as set forth in claim 16, wherein said voltage divider means comprise a plurality of voltage divider resistors; and wherein said photosensitive means has a first terminal connected to said second terminal of said source of electrical energy and a second terminal connected to one of said voltage divider resistors.

18. An arrangement as set forth in claim 16, wherein said voltage divider means comprise a plurality of voltage divider resistors; and wherein said photosensitive means has a first terminal connected to said first terminal of said source of electrical energy and a second terminal connected to a selected one of said plurality of voltage divider resistors.

19. An arrangement as set forth in claim 13, wherein said source of electrical energy has a first and second terminal; wherein each of said indicator means has a first terminal connected to said first terminal of said source of electrical energy and a second terminal, each of said indicator means furnishing the indication of said corresponding exposure value when the voltage across said indicating means is substantially zero and suppressing said indication when the voltage across said indicator means is a predetermined voltage substantially exceeding zero; wherein each of said switching stages applies a voltage substantially equal to the voltage at said first terminal of said indicator means to said second terminal of said indicator means when furnishing said activation signal; and wherein each of said third circuit elements comprise a transistor having an emitter-collector circuit connected from said second terminal of a corresponding one of said indicator means to said second terminal of said source of electrical energy when conductive, and a base connected to said second circuit element of said subsequent one of said switching stages in said predetermined sequence in such a manner that said emitter-collector circuit is conductive when said next subsequent stage furnishes said activation signal.

* * * * *